UNITED STATES PATENT OFFICE.

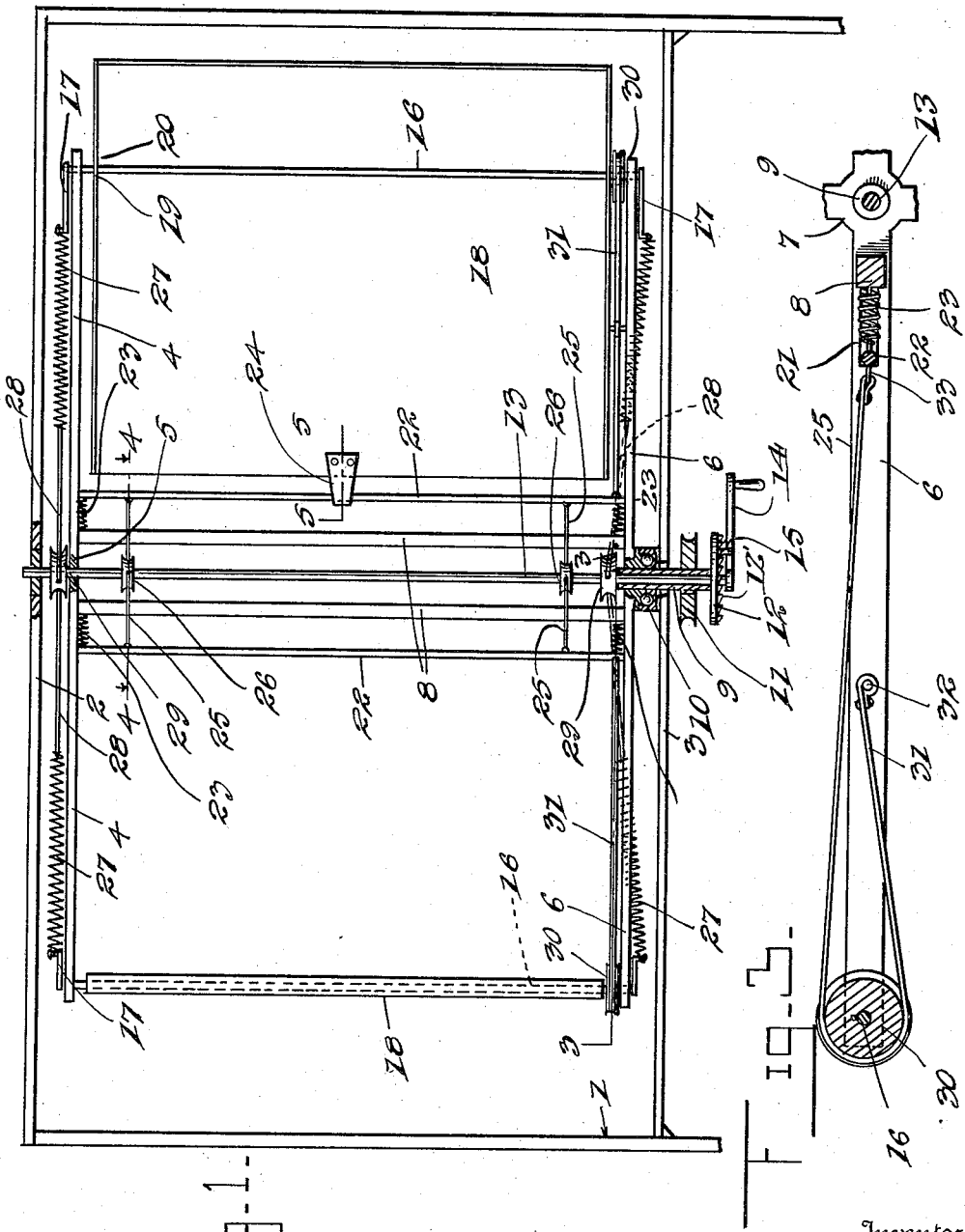

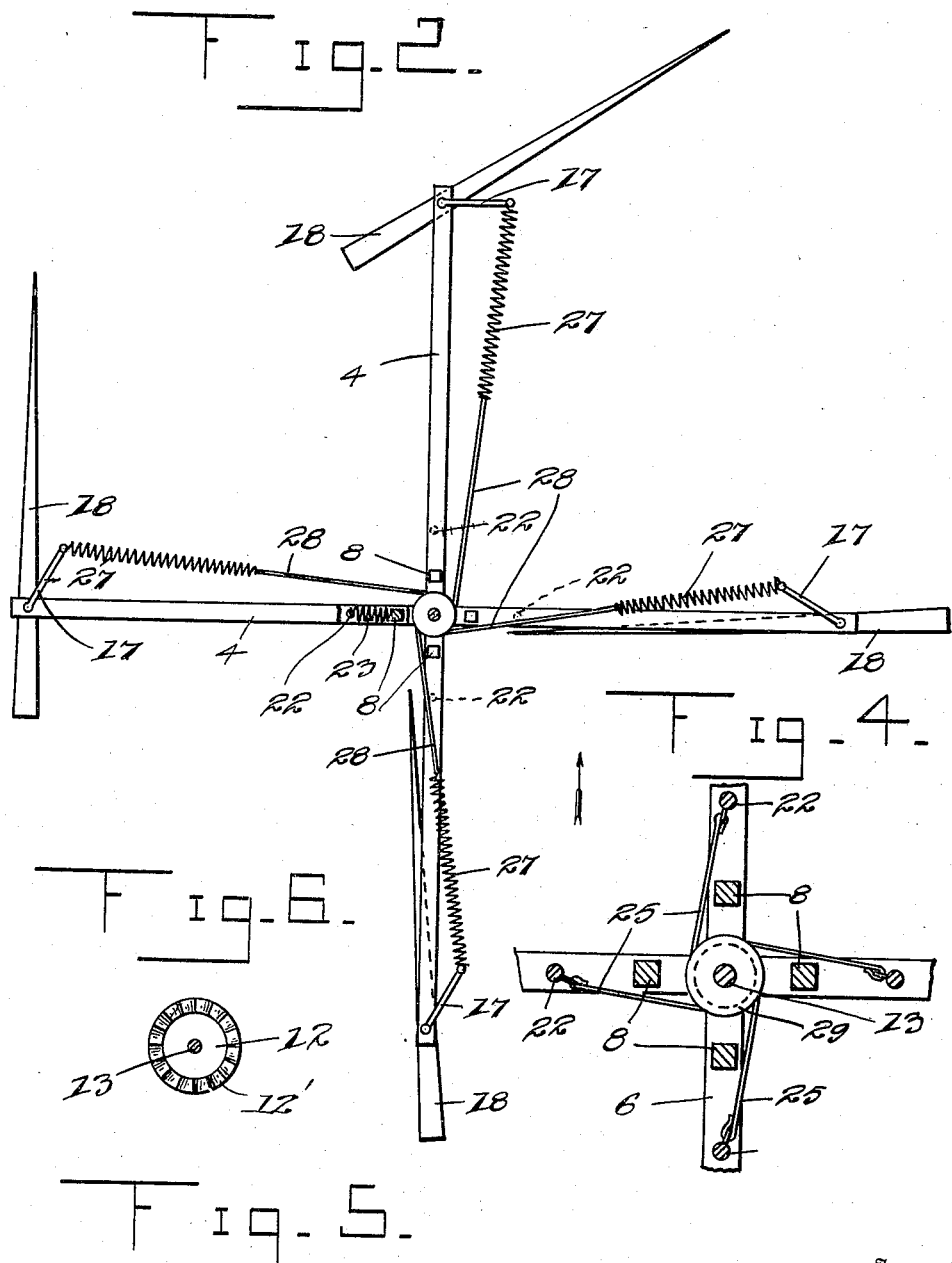

ORA N. VANSYOC, OF STRATTON, COLORADO.

WINDMILL.

1,149,875.  Specification of Letters Patent.  Patented Aug. 10, 1915.

Application filed January 23, 1914. Serial No. 813,917.

*To all whom it may concern:*

Be it known that I, ORA N. VANSYOC, a citizen of the United States, residing at Stratton, in the county of Kit Carson and State of Colorado, have invented certain new and useful Improvements in Windmills; and I do hereby declare the following to be a full, clear, and exact description of the invention, such as will enable others skilled in the art to which it appertains to make and use the same.

The primary object of this invention is to provide a windmill of extremely simple and practical construction, which may be run in either direction and which is devoid of all complicated mechanism.

Another object of the invention is to provide a windmill having blades mounted to swing about vertical axes and controlled so as to present their broad sides to the wind when moving in one direction and their edges to the wind when moving in the opposite direction.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of my improved windmill. Fig. 2 is a top plan view partly in section with the skeleton tower or supporting framework omitted, Fig. 3 is a horizontal section taken on the plane of line 3—3 of Fig. 1, Fig. 4 is a horizontal section taken on the plane of line 4—4 of Fig. 1, Fig. 5 is a section taken on the plane of line 5—5 of Fig. 1, and Fig. 6 is a detail view of a disk carried by the sleeve depending from the lower hub.

Referring in detail to the drawings by numerals, 1 designates, as an entirety, a supporting tower or framework having upper and lower bars 2 and 3 respectively. Within the skeleton frame 1 is mounted, to revolve around a vertical axes, a wheel including an upper series of radial arms 4 extending from a top 5 and a lower series of radial arms 6 attached to a hub 7, best shown in Fig. 3. A plurality of vertical standards 8 connect the corresponding arms of the upper and lower series and are positioned adjacent the inner terminals thereof. A sleeve 9 is concentrically secured to the hub 7 and projects downwardly therefrom through a bearing 10 mounted on the crossbar 3 of the tower 1 and supporting the wheel of the windmill. This sleeve is rigid with the hub 7 and has connected thereto a pulley 11 and a disk 12 having ratchet teeth formed on the lower face thereof, as shown in Fig. 6. A central shaft 13 extends through the sleeve 9, hub 5 and top bars 2 of the skeleton frame, and has secured to its lower end a crank handle 14 which carries a pawl 15 for engagement with the ratchet teeth 12′ of the disk 12.

A shaft 16 extends through each pair of arms 4 and 6, adjacent the outer ends thereof, and is provided upon each end with an angularly extending arm 17, said arms being disposed on the outer sides of the radial arms 4 and 6.

The blades 17 of the windmill appear essentially rectangular in elevation and are somewhat wedge-shaped in top plan, as is shown in Fig. 2. Each blade is formed adjacent its upper and lower edges with a pair of apertured ears 19 through which one of the rods 16 extend. The ears carry set screws 20 so that the blades may be securely locked to the shaft 16. It will be observed that a greater portion of the blades are disposed to one side of the shaft 16 than to the other side thereof, and the purpose of this will become apparent as the description proceeds.

Each of the arms 4 and 6 is formed in its inner face with a short longitudinal groove 21 positioned adjacent the inner end of the arm and for the purpose of receiving one terminal of a stop rod 22. These rods are vertically arranged and may move laterally within the groove 21. A plurality of expansive spiral springs 23 are connected at their outer ends to the stop rod 22 and at their inner ends to the standards 8 and serve to force the rod 22 toward the outer terminals of the grooves 21. These rods are adapted to be engaged by a stop plate 24 carried by the blades 18 so as to hold the blades against movement in one direction. The rods may be drawn inwardly out of the path of the stop plate 24 by means of flexible connections 25 secured thereto and to pulleys 26 rigid with the shaft 13. It is apparent that when the shaft is revolved so as to wind the flexible member 25 on the pulley 26 that the rod 22 will be drawn inwardly so as not to contact with the plate 24.

To cushion the contact of the stop plate 24 against the rod 22 when the windmill is in operation, I connect to the free terminal of each of the arms 17, a contractile helical spring 27, the inner ends of said springs being connected to flexible members 28 which are in turn secured to pulleys 29 rigid with the central shaft 13. The connections 28 are wound around the pulleys 29 in a reverse direction to the way in which the connections 25 are wound around the pulleys 26, so that when the former are being wound on their pulleys, the latter are being unwound.

To each of the shafts 16, directly under the blades 18, is secured a brake drum 30 around which extends a flexible steel brake band 31. One end of the band is secured, as best shown in Fig. 3, to the arms 6 by means of a pin 32 and the other end is connected by any suitable fastener 33 to the corresponding stop rod 22, so it will be evident that when the stop rod is drawn inwardly, the brake band will be tightened.

Having described the construction of my improved windmill, I will now explain the operation thereof. When the parts are in working position, the stop rods 22 are at the outer terminals of the slots 21 and the springs 27 are under tension. Referring to Fig. 2, it will be seen that when the wind is blowing in the direction indicated by the arrow, the blades 18 on the right hand side of the mill will present broad sides to the wind so as to receive the full force of the wind, whereas those on the left side from moving toward the wind will present longitudinal vertical edges for engagement therewith. When it is desired to have the mill remain stationary, the stop bars 22 are drawn inwardly out of the path of the stop plate 24, so that all of the blades will be free to swing into the wind. Simultaneously with an inward movement of the rods 22, the brake bands 31 are tightened to prevent the blades from whipping in a gusty wind.

From the foregoing description taken in connection with the accompanying drawings, it will be apparent that I have provided a very simple and practical windmill which may be easily and quickly drawn into and out of gear. It will be understood that if desired the blades 18 may be curved transversely and that a set of stationary blades may also be provided.

While I have shown and described the preferred embodiment of my invention, it will be understood that minor changes in construction, combination and arrangement of parts may be made without departing from the spirit and scope of the invention as claimed.

Having thus described my invention, I claim:—

In a windmill, a supporting frame work, a wheel within said supporting frame work and including two parallel sets of radial arms, the radial arms of each set being connected at their inner ends to a hub, a central shaft extended through said frame work and said hub, a shaft journaled through the outer portions of corresponding arms of each set, said shaft supporting blades positioned between said sets of radial arms, one blade being secured to each of said shafts, said shafts dividing the blades into two sections of unequal areas, angularly extending arms mounted upon the opposite ends of said shafts, stop rods slidably connected to said arms, contact plates carried by the blades for engagement with the stop rods when the latter are in their outermost position, resilient connections between the angularly extending arms and the central shaft, drums mounted upon the shafts extended through the outer end of the arms of the set, brake bands connected with the radial arms and the stop rods and engaged around said drum, said brake bands being adapted to be tightened upon inward movement of the stop rods, the resilient connections between the angularly extending arms and the central shaft being adapted to be tightened upon outward movement of the stop rods, and means for drawing the stop rods inwardly, said stop rods being resiliently retained in their normal outermost position.

In testimony whereof I affix my signature in presence of two witnesses.

ORA N. VANSYOC.

Witnesses:
J. E. HOLTZ,
SIDNEY CEARS.

Copies of this patent may be obtained for five cents each, by addressing the "Commissioner of Patents, Washington, D. C."